(12) United States Patent
Becker et al.

(10) Patent No.: US 7,673,067 B2
(45) Date of Patent: Mar. 2, 2010

(54) PIPELINE FOR DATA EXCHANGE BETWEEN MEDICAL IMAGE APPLICATIONS

(75) Inventors: Detlef Becker, Möhrendorf (DE); Ralph Mayr, Fürth (DE); Falk Tintemann, Röttenbach (DE)

(73) Assignee: Siemens Aktiengesellschaft, Munich (DE)

(*) Notice: Subject to any disclaimer, the term of this patent is extended or adjusted under 35 U.S.C. 154(b) by 1183 days.

(21) Appl. No.: 11/244,598

(22) Filed: Oct. 5, 2005

(65) Prior Publication Data

US 2006/0101154 A1 May 11, 2006

(30) Foreign Application Priority Data

Oct. 5, 2004 (DE) .................. 10 2004 048 460
Nov. 26, 2004 (DE) .................. 10 2004 057 305

(51) Int. Cl.
*G06F 15/16* (2006.01)
(52) U.S. Cl. .................................... 709/236
(58) Field of Classification Search .......... 709/230–246
See application file for complete search history.

(56) References Cited

U.S. PATENT DOCUMENTS

| | | | |
|---|---|---|---|
| 7,089,320 B1 * | 8/2006 | Biederman et al. ......... 709/234 |
| 7,366,165 B2 * | 4/2008 | Kawarai et al. ............. 370/366 |
| 2002/0191785 A1 | 12/2002 | McBrearty et al. |
| 2003/0210711 A1 | 11/2003 | Faust et al. |
| 2004/0003147 A1 | 1/2004 | Masputra et al. |
| 2004/0221056 A1 * | 11/2004 | Kobayashi ................. 709/232 |
| 2005/0182846 A1 * | 8/2005 | Schofield et al. ........... 709/232 |
| 2005/0196030 A1 * | 9/2005 | Schofield et al. ........... 382/132 |

* cited by examiner

*Primary Examiner*—Salad Abdullahi
(74) *Attorney, Agent, or Firm*—Schiff Hardin LLP

(57) ABSTRACT

The invention relates to a method, an apparatus and a system for the transfer of medical image data from at least one source application to at least one sink application, and for managing the data transfer via a controller and a message system. The method is based on a pipeline mechanism that comprises various processing stages, a requester and a serializer controller that controls the data steam to be transferred. The pipeline mechanism comprises a serializer that decomposes the data stream in individual chunks or reassembles the decomposed chunks to form a data stream, and a carrier that is responsible for the physical data transmission. Moreover, the pipeline can also comprise a converter and a manipulator that respectively execute conversions and manipulations on the data.

30 Claims, 6 Drawing Sheets

FIG 4
Push scenario
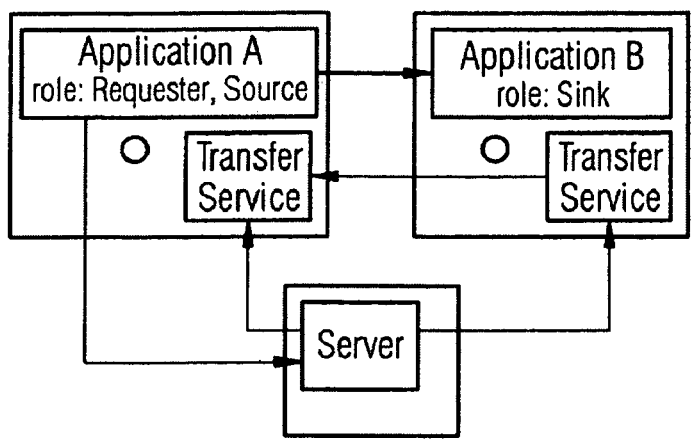
Move scenario
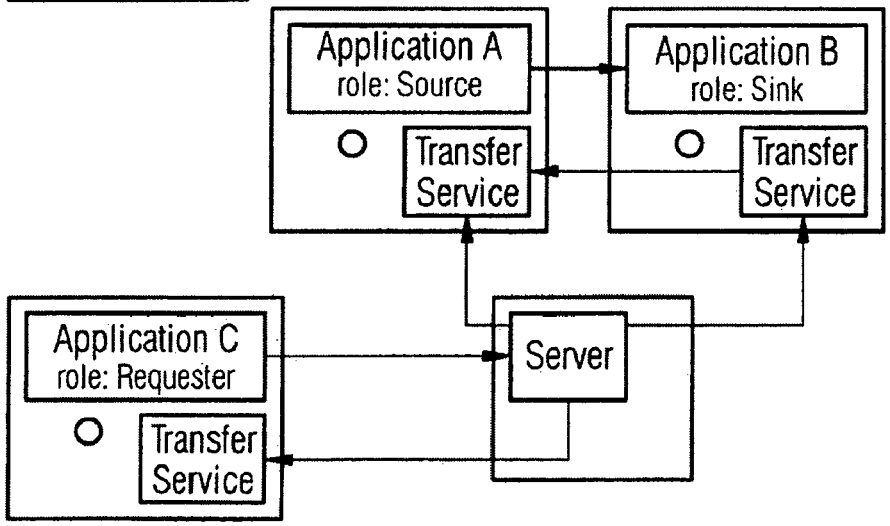
Pull scenario
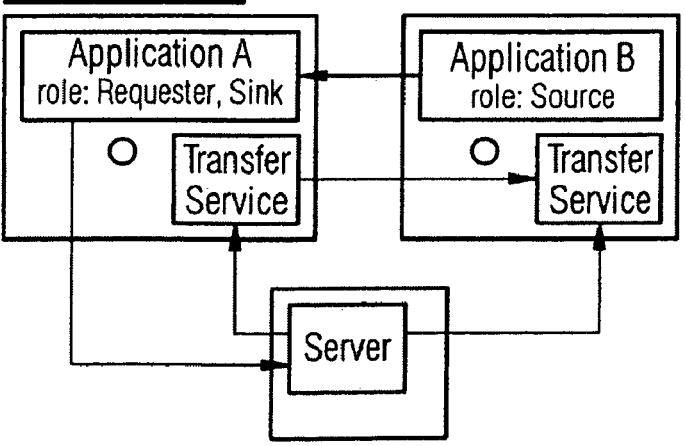

PIPELINE FOR DATA EXCHANGE BETWEEN MEDICAL IMAGE APPLICATIONS

BACKGROUND

The invention relates to a method, an apparatus and a system arrangement for the transfer of data, in particular medical data, such as images, three-dimensional images, video recordings, demographic patient data or images of various imaging medical devices, between a source application and a sink/destination application. The invention is also directed at managing the data transfer.

The invention relates, in particular, to a pipeline mechanism that is intended for successively processing the data for the transfer, and comprises various processing stages and/or functions.

If it is necessary to exchange large data volumes between two applications, there is a need for data management that enables data to be transferred flexibly and efficiently.

The main field of application of the present invention is that of medical technology. However, all other areas of application are also possible where these require data to be exchanged between applications relate to a system in a field such as process engineering or manufacturing technology.

The problems existing in exchanging data as mentioned above between two applications lie principally in the limited time for the data exchange, in the limited network capacity, in a limited network performance, in various data formats between the applications, and in a limited available computer performance. In addition to further parameters, the above-mentioned variables constrain the exchange of large data volumes and can therefore lead to problems.

A need exists to provide flexibility and configurability of the data transfer mechanism, since the aim is to image the most varied scenarios in the data exchange model. For example, it should be possible in different instances to determine and/or to set whether a specific data exchange performance is to be adhered to, or that the data transmission is performed within a maximum time period.

For example, if two Picture Archiving Communication System (PACS) applications are communicating with one another, medical image data series that have been acquired, for example, by a computer tomograph CT or a magnetic resonance apparatus, must be transmitted to other applications at different positions within the network.

With prior art systems, use has been made for this purpose of different transfer mechanisms, all of them based on the Digital Imaging and Communications in Medicine (DICOM) Standard. Since this standard is very complex, however, and the prior systems are not flexible enough to be able to adapt to current and frequently changing requirements, the performance achievable with prior systems is frequently not satisfactory, since so far all configurations of the two communicating applications have needed to be tested for correspondence. Thus, the transfer requirements necessitated by the respective communication peers or applications are negotiated at the time of connection. There is no longer any defined possibility of change and/or control during the subsequent transfer. This renders prior systems very inflexible.

The application that receives the required data also generally has to process the data further. Consequently, it is sensible when the receiving application can also determine the transfer and/or the data flow and, for example, can fix the sequence in which the data units are to be sent, that the subsequent further processing of the data is supported. This possibility of exerting influence does not exist in prior art systems.

For this reason, it is desirable to provide a system that enables an exchange of data between two applications in the case of which it is possible to achieve maximum throughput and also to operate on large transfer volumes. It should therefore be possible for the data transfer to be independent of the transfer medium such as from the network or the type of network (for example TCP/IP), of serial connections (for example USB etc.) or offline media (for example DVD).

Moreover, an asynchronous behavior should also be possible such that even long running jobs can be executed asynchronously and such a job can also be cancelled if required. It should, moreover, be possible to integrate the system into any existing systems where it is required to exchange large data volumes. That is to say, the system should have simple interface profiles.

Furthermore, it should be possible for the system to operate separately, i.e., independently of a data management system, or of a data management application and a client. Moreover, a status display should be possible such that all the participants of a data exchange job are informed of the status of dependent data exchange jobs. This has the advantage that the user receives additional information on existing data exchange jobs, and is thereby better informed.

Again, the system should optionally support an exchange of separate data objects and an exchange of streaming data in the case of which a number of data objects are combined, and which enable at least one subscriber to control the data flow. It should further be taken into account that the data transfer or the exchange of data in general is very susceptible to error, since various error sources exist (transmission system errors, reception system errors or errors in the case of the selected data transmission channel etc.). Consequently, the system should be as error tolerant and strongly configurable as possible and be as adaptable as possible to current transfer requirements.

SUMMARY

The present invention advantageously takes account of all the above named points and problems and is, moreover, adapted to provide and utilize the above named advantages.

Wherever previously the aim was to exchange data between two applications designed, in particular, for processing medical image data, it was necessary to prepare (conFigure) the communication or the exchange of data by hand before it could be executed. This procedure is susceptible to error. As a rule, the required steps have not so far been standardized.

In order to avoid the above named disadvantages according to the prior art methods, and to facilitate the desirable aspects, explained above, of a transfer of data, various embodiments of the present invention indicate a way with the aid of which data can be transferred from at least one source application to at least one sink or destination application, it being possible to process the data successively or in stages with reference to the transfer such that it is possible even to exchange large data volumes quickly and reliably and at a high transmission power or rate, to process various data formats, and to execute further conversions and further manipulations on the data for the purpose of data transmission, such that the data can be received unaltered in the case of the receiving sink application, it remaining possible to provide additional data exchange information.

This object is achieved with the methods, apparatuses and system arrangements in accordance with the various embodiments of the invention discussed below.

In particular, the object is achieved with a method for transferring data, in particular, medical image data, from at least one source application to at least one sink application, comprising:
- a requester that initiates the data transfer,
- a serializer controller that enables control and/or monitoring of the data transfer,
- a pipeline mechanism that is intended for successively processing the data for the data transfer and comprises at least the following:
  - a serializer function that is intended for decomposing the data stream into individual chunks before the transfer and is intended for reassembling the decomposed chunks to form a data stream after the transfer, and
  - a carrier function that is designed for executing the physical data transmission.

Moreover, the object is also achieved by a more comprehensive method that is directed to managing the data transfer. The method then additionally also comprises a controller function that controls and/or monitors a processing phase for the data transfer, and a message system that collects all the relevant status information with reference to the data transfer and, in particular, passes on status variations to participating modules.

In the method according to an embodiment of the invention, the respective function fundamentally corresponds to the respective module of the apparatus according to an embodiment of the invention. The controller function of the method therefore corresponds, for example, to the controller of the apparatus according to an embodiment of the invention. All the features that are named in conjunction with the apparatus are also to be transferred to the method, and vice versa.

The controller and the message system are central components. They are preferably arranged at a hierarchical level higher than the individual components of the pipeline.

The controller is the central unit and manages the overall transfer, starting from the selection of the communication peers, i.e., the applications, via the creation of a communication link for the data transfer as far as the provision of control and monitoring mechanisms. The controller is therefore incorporated in a hierarchically superordinate level above the other modules of the pipeline and/or on the level of the applications and of the message system.

Owing to the central design of the controller and of the controller function, it is possible to make use of the transfer configurations appropriate for the respective transfer, which are of optimum design. Thus, one peer can exhibit different transfer requirements than another peer. Moreover, the peers can differ from one another with regard to the capabilities in terms of information technology (for example, existing installations, storage, etc.), with regard to the transfer constraints (for example, only encoded transmission possible), and to the data format to be processed. All these points of view play a role in the selection and termination of the transfer configurations, and can thus be taken into account. It is therefore possible for the transfer, which is adapted to the respective requirements of the applications, to the data to be transferred, and/or to communication links, to be designed dynamically.

The controller is also responsible for initiating the setting up and clearing down of the transfer connection, and thus for the transfer infrastructure as well as for the monitoring of the real data transfer.

Before the actual pipeline mechanism is used for transmitting the data, in a preparatory phase, the controller undertakes all the required settings and/or configurations, preferably doing so automatically. The preparatory phase is then followed by the actual transfer phase, in which the data are transmitted via the pipeline.

The message system collects and distributes all the transfer-related states and variations in the status to all the participating components and/or modules or functions. Messages that are communicated via the message system preferably relate to status information with reference to the transfer, and are directed to the participating applications. However, it is also possible to manage additional messages via the message system. In addition to the communication of information via the message system, data can also be exchanged directly between the participating modules.

The main field of application of the present invention relates to the processing of medical image data or image data series. However, it is also possible to extend the invention to all further fields of application that require data to be exchanged between two applications of a network that should be flexible and adaptable.

The term "source application" is to be understood as "transmitter" of the transmitted data, and the term "sink application" is to be understood as "receiver" of the transmitted data. The "requester" or the "requester application" is to be understood as the initiator of the transmission.

The pipeline mechanism according to various embodiments of the invention comprises a number of processing stages and is of virtually completely symmetrical design, that is to say it, comprises the same modules on the sink application side as on the source application side, only in reverse sequence. It is therefore used to prepare the data for the data transfer and to structure them such that it is possible to transfer large data volumes in a fashion that is as quick and adaptable as possible and can be configured at as high a level as possible. The pipeline is of symmetrical design with regard to its other modules, except for the serializer controller function, which is provided exclusively on the source application side.

In the preferred embodiment, the pipeline mechanism comprises the serializer function, which is intended for serializing the data flow, i.e., for decomposing it into consecutive, separate chunks, and for reassembling the decomposed chunks to form a data record after the transmission. Moreover, the pipeline mechanism comprises a carrier function that is arranged at the level of the transport layer. The carrier interface is the linking element between the symmetrical parts of the pipeline, the two parts of the transfer chain. The carrier function covers the physical data transmission, that is to say, the wire link or the wireless link to the corresponding protocols. The carrier function is designed such that it comprises at least the transport layer of the ISO-OSI network reference model. In an alternative, advantageous embodiment, the carrier function is additionally designed such that it also comprises the network layer of the ISO-OSI reference model in addition to the transport layer.

The carrier function has no restrictions with regard to the transfer medium or with regard to the transfer mechanism. This results according to various embodiments of the invention in the advantage that the entire transfer mechanism is not bound to a specific transfer medium or a specific transfer mechanism and/or a specific transport protocol, and so such embodiments of the invention have far-reaching possibilities of application and can be integrated in a multiplicity of different existing systems.

In an advantageous alternative embodiment, the pipeline mechanism comprises not only of the serializer function and the carrier function, but in addition also has a converter function that is designed for converting different data formats. If, for example, the source application can understand and/or process other data formats than the sink application, it is sensible to install a converter function in the pipeline in order to be able to interconvert the different data formats.

In a preferred embodiment, the pipeline mechanism comprises two converters, one on the side of the sink application, and one on the side of the source application. With the aid of the arrangement of two converters in the pipeline, it is possible to use an intermediate format for transmitting the data such that a transmission data format is converted into the intermediate transmission data format, and the intermediate transmission data format is converted into the reception data format of the sink application.

This embodiment is admittedly somewhat more expensive and complex, since two converters participate, but it does offer the advantage of achieving a flexibility with regard to the data transfer. Thus, for example, images can be transmitted in compressed fashion such that higher transfer rates can be achieved with the use of compression algorithms—even given a slower transfer medium.

In an alternative embodiment, one converter is included in the pipeline, instead of two. This converter is advantageously on the side of the source application such that the source-side serializer can interact with the converter. However, it is also possible as an alternative to provide the converter on the side of the sink application.

In an advantageous development of the invention, the pipeline comprises a manipulator function that is designed in order to carry out various manipulations on the data to be transferred.

Thus, in addition to the serializer function and carrier function the pipeline can optionally comprise a converter function and/or a manipulator function. That is to say, it is possible for the pipeline to consist of a serializer, a carrier and a manipulator.

By contrast with the converter function, the manipulator or the manipulator function must always be used in pairs. The manipulator on the side of the source application inhibits the data stream or executes manipulations on the data stream, while the manipulator on the side of the sink application must neutralize these manipulations again. It is important in this case that these manipulations remain completely hidden from the source application and from the sink application. That is to say, a user of the source application or a user of the sink application does not notice anything of the changes executed by the manipulator function.

The manipulations that are executed on the data stream by the manipulator function must always be independent of the data format. Furthermore, they must be reversible, i.e., they must be capable of neutralization.

The manipulator interface is used chiefly for executing data compression, and for encoding the data or for cryptological purposes. In the case of a cryptographic encryption, the cryptographic key is, for example, also to be transmitted during the process of building up the link between the source application and the sink application. According to various embodiments of the invention, the pipeline mechanism comprises the serializer function, which is provided both on the side of the source application and on the side of the sink application. The serializer function on the source application side is designed for the purpose of decomposing the data stream, i.e., the various constituents of an object, into chunks. On the side of the sink application, the serializer function is designed in order to reassemble the individual chunks already transmitted to form a data stream.

In order to be able to execute this decomposition, it is important that the serializer recognize the object structure and, in particular, the logic units. The object structure can also be denoted as the data format of the object. It is therefore a task of the source application to collect object-related data and make them available. A serializer can usually process respectively only a special data format, or can process only such objects as are present in this format. It is, however, proposed according to various embodiments of the invention that all the compatible data formats can likewise be processed by the serializer by executing data conversion before execution of the serializer function.

A DICOM image can be treated as an object. In order to transfer this DICOM image in a way according to various embodiments of the invention, the image can be decomposed into parts, preferably by demarcation between the header information and the actual pixel data. However, it is also possible that the object is not decomposed and is transferred as one part.

The serializer on the sink side requires information relating to the transmitted object and/or to the decomposition of the object into parts. The serializer usually makes this information available to the source side by generating the objects and headers and transmitting at least the parameters of these data structures.

The serializer on the side of the source application differs in its mode of action from that of the serializer on the side of the sink application. The source-side serializer is driven by the serializer controller, while the sink-side serializer is driven or initiated by the chunks already transferred.

The serializer controller is arranged on the side of the source application. It serves for controlling and/or monitoring the data stream. The serializer controller has the capacity to be remotely controlled. Although the serializer controller is arranged on the side of the source application, in the preferred embodiment its substance is designed in accordance with the requirements of the sink application and/or it is controlled by the sink application (and therefore "remotely").

The serializer on the source side of the pipeline accesses the source application, in particular the serializer exclusively accesses the source application. According to various embodiments of the invention, the requirement profile of the data that are required on the side of the sink application is a basis for designing the serializer controller. In an advantageous alternative embodiment of the invention, the serializer controller is alternatively and/or cumulatively designed with the aid of further parameters, in particular according to the requirements of the source application. The serializer controller is preferably designed as a local entity and is distinguished from the controller, which is of central design and serves for monitoring the entire transfer operation including the preparatory phase.

With reference to the OSI layer model, the carrier function takes over tasks of the OSI transport layer and/or the OSI network layer with the aid of appropriate protocols. Owing to the stepwise processing and the design of the carrier function according to the invention, the procedure according to the invention is very flexible and can be adapted to specific requirements.

The requester is provided according to various embodiments of the invention in order to initiate the data transfer. The application that initializes the data transfer is therefore called a requester in accordance with these embodiments. Thus, in some instances, the requester can correspond to the sink application or to the source application. In other embodiments, the requester can be formed by a further application. Depending on which application forms the requester, what is present is a pull scenario, a push scenario or a move scenario. The requester can basically be subdivided into two constituents: firstly, the data transfer request per se and, secondly, the monitoring part of the request.

The above-described, inventive embodiments of the method can also be designed as a computer program product with a medium that can be read by a computer, and with a computer program and associated program code, the computer being prompted after loading with the computer program to carry out the above-described, inventive method.

An alternative achievement of the object provides a storage medium that is intended for storing the above-described, computer-implemented method and can be read by a computer.

Additional advantageous embodiments follow from the description below.

DESCRIPTION OF THE DRAWINGS

In the following detailed description of the Figures, exemplary embodiments—which are not to be understood restrictively—are addressed together with their features and further advantages with the aid of the drawings.

FIG. 4 is a block flow diagram showing a summary illustration of constituents of a system according to the invention in accordance with a preferred embodiment, comprising a pull scenario, a move scenario and a push scenario;

DETAILED DESCRIPTION OF THE PREFERRED EMBODIMENTS

Figure 1:
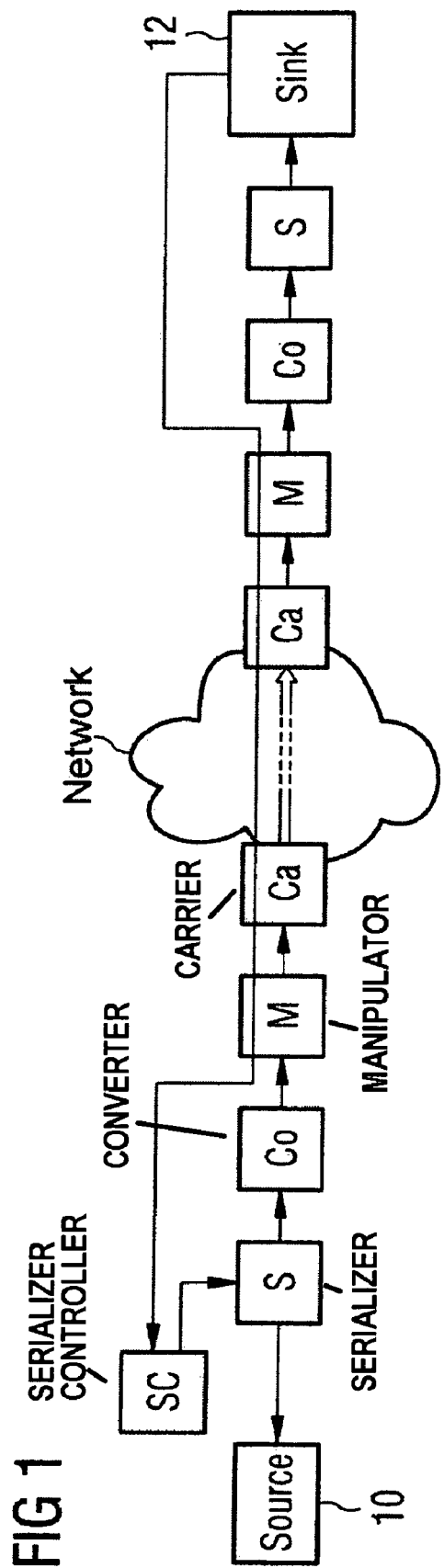
FIG. 1 is a block sequence diagram providing a summary illustration of constituents in accordance with an advantageous embodiment of the invention.

The fundamentals of the method according to a primary embodiment of the invention, and the main constituents of the apparatus according to this embodiment of the invention are explained with reference to FIG. 1.

The aim of the method and the apparatus is to transfer data from a source application or source, denoted in general by 10, to a sink application (receiver) or sink, denoted in general by 12. In the preferred embodiment, the data transfer is intended to be performed via a network. This is illustrated in FIG. 1 by the cloud-like outline symbol. In alternative embodiments, the data are transferred not via a network but, for example, via a line specially provided for the purpose or a tie line, or via another online or offline medium.

Provided according to this embodiment of the invention between the source application 10 and the sink application 12 are various components that are all constituents of a pipeline according to this embodiment. Provided on the side of the source application in addition to these components is a serializer controller SC that controls and/or monitors a data stream to be transferred. The serializer controller SC comprises an interface to a serializer S that is the initial element in the pipeline. The serializer controller SC is provided only on the side of the source application 10 and is, however, controlled by a remote system, in particular by the sink application 12. The first element on the source side of the pipeline, the serializer S, accesses data of the source.

In the preferred embodiment, the pipeline is constructed symmetrically and comprises two pipeline parts: a source-side part and a sink-side part. In an alternative embodiment of the invention, however, the pipeline is constructed asymmetrically. Moreover, the pipeline can also comprise fewer constituents and comprise, for example, only a serializer S and a carrier Ca.

In the preferred embodiment, the pipeline comprises a serializer S, a converter Co, a manipulator M and a carrier Ca. All the abovementioned constituents are preferably to be found in reverse sequence on the side of the sink application 12. The pipeline components and/or modules according to the apparatus of various embodiments of the invention, specifically the serializer S, the converter Co, the manipulator M and the carrier Ca, and the serializer controller SC correspond in substance to the respective functions of the method according to appertaining embodiments of the invention, specifically the serializer function S, the converter function Co, the manipulator function M and the carrier function Ca, and the serializer controller function SC. The reference symbols are used consistently.

Even given requirements that vary during the running time, the inventive design of the method enables a high flexibility in the data transfer.

The main field of application of the invention is in the medical sector and in the processing of medical image data, preferably in the DICOM format. However, the invention can also be applied to any other format and object.

If, for example, a source application 10 is communicating with a sink application 12, which are based on data of the same data format and require no further conversion and/or manipulations of the data, it is possible to use a pipeline that consists only of the serializer S and the carrier Ca. In other cases, in which, for example, the source application 10 requires a different data format than the sink application 12 to which the data are to be transferred, the pipeline according to embodiments of the invention is formed from the serializer S, the converter Co, the manipulator M and the carrier Ca, which are provided symmetrically on both sides, but in reverse sequence.

The serializer is used to decompose the data stream into individual chunks 14 before the data transfer. Particularly by decomposing complex image data into individual chunks 14, the data transfer can advantageously be substantially improved and the performance can be substantially increased.

The converter Co takes over the function of interconverting the data formats that are variously present.

If necessary, the manipulator serves for executing further manipulations of the data.

The carrier Ca is the last or first element in the pipeline, and takes over the actual, physical data transmission. In accordance with the OSI layer model of the ISO (International Standardization Organization), the carrier Ca covers tasks of an OSI transport layer. In an alternative embodiment, as well as the OSI transport layer the carrier Ca additionally covers the tasks of an OSI network layer. Moreover, the corresponding protocols for data exchange are supported.

If on occasions in the past when the aim was to use prior art methods to transmit each data, in particular medical image data, for example of an PACS application, to another application, it was necessary for the entire image object or the image data series to be transferred as a whole. This led to long processing times. Moreover, there was also a very high susceptibility of such systems to errors, since an error in transmission fundamentally led to an error in the data transfer.

Figure 2:
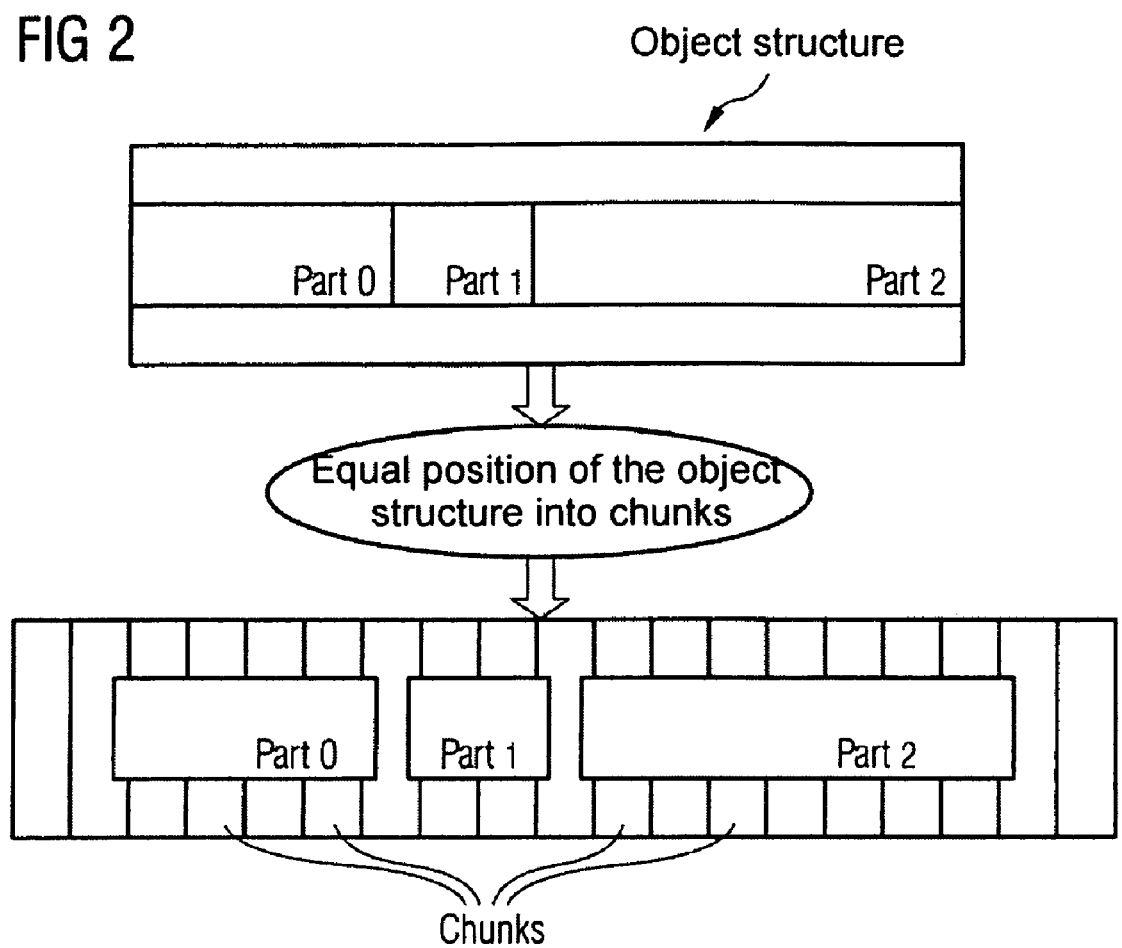
FIG. 2 is a structure-flow diagram illustrating a schematic of data to be transferred, and of a decomposition of an object structure in accordance with the advantageous embodiment of the invention.

According to various embodiments of the invention, owing to the design of the serializer S, it is possible to decompose the image object to be transmitted into individual chunks 14. This operation is explained in more detail in FIG. 2.

The object structure to be transmitted consists of a number of parts Part 0, Part 1 to Part n. This object structure is decomposed into individual chunks 14 in a fashion according to various embodiments of the invention For example, an individual DICOM image can be treated as an object. In accordance with the header information and the pixel data, the DICOM image is processed into individual parts. A part is a logic structure of an object. Each object has at least one part. As already mentioned, a DICOM image can thereby be processed as a two-element object comprising header data and pixel data.

According to various embodiments of the invention, an object is decomposed into a multiplicity of chunks 14. Each chunk 14 comprises meta information and the data that relate to the respective part. The number of the chunks 14 for an object is dependent on the respective implementation. The additional information that is required for the data transfer is introduced into the data flow. The meta information introduced into the data flow or data stream can be present in chunk meta information, the header of a part or the header of an object etc. The inventive decomposition of an object to be transmitted into individual chunks 14 has the effect that the functionality and performance of the data transfer can be substantially increased.

Moreover, it is possible according to various embodiments of the invention for the sequence of the object to be transferred to vary as a function of current transfer requirements. The object sequence can differ from the original request sequence, for example, if a quality-of-service module prompts a change to the sequence, or if at least one object is excluded from the data transfer on the basis of security regulations, or are not known in the source 10.

The main function of the serializer controller SC is explained below in conjunction with the state diagram illustrated in FIG. 3. The serializer controller SC serves for controlling the data flow to be transferred, doing so in accordance with the requirements of the sink application 12. This is possible by transmitting commands to the serializer controller SC. The commands can be issued locally or non-locally. In particular, it is possible to issue the commands for controlling the serializer controller SC directly from the sink application 12.

The serializer controller SC is active only on the side of the source application 10 of the pipeline. The serializer controller SC is therefore the first processing stage on the side of the source application 10, and fills the serializer S with an input queue or with an input sequence. Moreover, the serializer controller SC controls the entire transfer chain.

Figure 3:
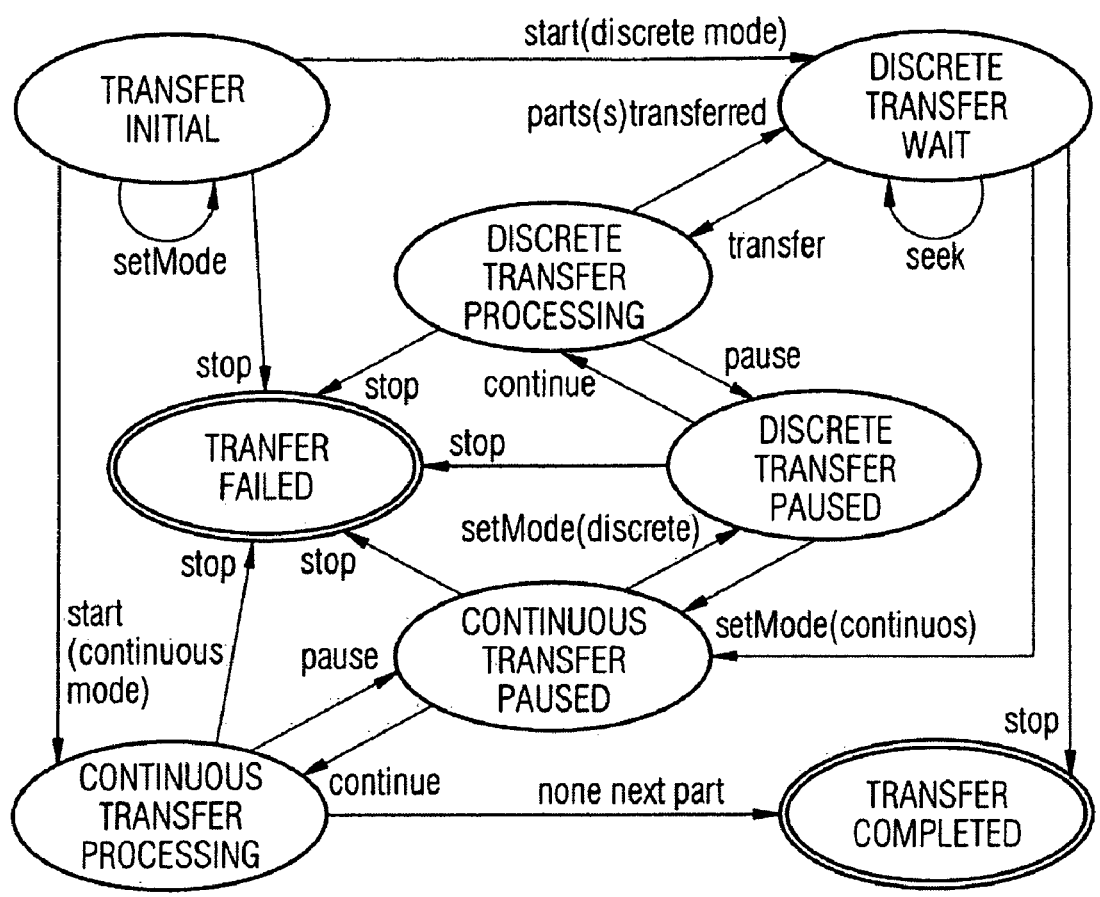
FIG. 3 is a state diagram illustrating the transfer of data.

A brief explanation of the commands, using FIG. 3, for controlling data flow follows:

set Mode: permits the specification of the transfer mode (continuously or discretely).
start: initial starting point of the transfer.
stop: end or termination of the transfer.
pause: pausing of the running transfer.
resume: resumption of the transfer after an interruption.
seekObject: setting the logical object pointer to the required object.
seekPart: setting the logical part pointer to the required part.

The serializer controller SC implements the transfer state diagram that is shown in FIG. 3. The state diagram stipulates in which situations which commands are valid for the data flow or for controlling the data flow.

A status is marked in each case by an ellipse in FIG. 3. The start state is illustrated top left and has an incoming arrow that has no dedicated starting point. End states are marked in each case by a double ellipse. Possible changes in state are marked by arrows. Generally, the name of an arrow is the respective command for the data flow or for the control of the data flow that has initiated the respective transfer state. If the transfer state has not been initiated directly by a data flow command, but by a further activation state or an activation condition, this activation condition may be recognized as the name of an arrow in italics. A state for a special data flow control command can also possibly not exhibit an outgoing arrow. This is intended to explain that this command is not permitted in this special state.

All the abovementioned commands can be subdivided in principle in two groups: the first group comprises commands that are executed directly and synchronously. The following commands belong to this group: start, stop, pause, resume and setMode. The other group of commands are stored in a buffer in a First-In-First-Out (FIFO) buffer, and cannot be executed directly. Belonging to this group, by way of example, are the following commands: seekObject and seekPart. These commands cannot be executed directly since, for example, preceding commands are still pending. This enables an asynchronous and non-blocking behavior. The size of the buffer for data flow control commands can be limited. The provision of the inventive possibility of storing data flow control commands or processing them in a queue implies that these commands exhibit a delayed reaction response in part.

After a part has been transmitted, the next part can be transmitted. However, it must be determined in advance which part it is. For parts belonging to the same object, this stipulation requires little outlay. However, for parts that go beyond an object boundary, the determination requires additional information such as the granularity of the data flow control.

Various scenarios of an embodiment according to the invention are explained below in conjunction with FIG. 4.

The pipeline comprises the modules of requester R, source application 10 and sink application 12.

If the requester R corresponds to the sink application 12, there is a pull scenario (requirement scenario: application A would like to have data); if the requester R corresponds to the source application 10, there is a push scenario (push scenario in the case of which the data are to be pushed to another position); if the requester R is formed by another application (by application C in FIG. 4), there is a move scenario (move data from A to B). The various scenarios are illustrated in FIG. 4.

Generally, the source application provides the data for the data transfer. Mapping of the requested objects and object identifiers is required for this purpose. In a preparatory phase, the source application 10 must collect the information that is required for the data transfer such as object size etc.

During the data transfer, the source application 10 is informed of the current state of the data transfer and of any changes. This is preferably done via a message system 18 that is intended for collecting and for passing on all the relevant transfer status information.

Moreover, the source application 10 must support a quality-of-service (QoS) and restructure possibly requested objects and reorder the identifiers for these requested objects, doing so on the basis of the requested properties.

However, the source application 10 should be designed such that it can operate asynchronously.

The sink application 12 generally has the same requirements and characteristics as were explained above in conjunction with the source application 10. By contrast with the source application 10, the sink application 12 is able to control the data stream via the interface to the serializer controller SC. It is thereby possible to adapt the transfer to the current requirements of the sink application 12.

A further difference between the sink application 12 and the source application 10 consists in that the sink application 12 need support no aspects with regard to the QoS.

The advantages of the subdivision according to various embodiments of the invention of the data objects to be transferred include the adaptability of the system to different hardware components, as well as to already existing software modules. Moreover, the performance and the configurability can be substantially increased by the user. The aim below is to explain by way of example how a DICOM image is transmitted according to these embodiments the invention from a source application 10 via a slow network, in particular a slow WAN (Wide Area Network) to a sink application 12, the latter being able to process only JPEG images.

The first processing stage is the serializer S, which decomposes the object. Since the data transmission is intended to be performed via a slow transfer medium, the next processing stage is a converter function Co that makes a highly compressed two-part object from the DICOM object. The processing stage following thereupon consists of the manipulator M, which encodes the data in order to ensure data security. The last processing stage on the side of the source 10 consists of the carrier Ca, which is specially designed for WAN transfers and passes on the data to the sink 12. This concludes the source-side part of the pipeline.

Following thereupon is the sink-side part of the pipeline, whose first element is the carrier Ca, which receives data via the WAN. The next processing stage is the manipulator M, which encodes and decodes the data stream. Since the sink application 12 can process only JPEG images, the third processing stage must be a converter Co for the purpose of converting the highly compressed two-part object into an object of the JPEG format. The last element of the pipeline must, of course, be a serializer S that can process this object type.

A substantial advantage of the procedure according to these embodiments of the invention includes being able to minimize greatly the consumption of the resources for the transfer. There is advantageously no need for any additional memory in this procedure. Accordingly, the data are transferred by being read from the original memory and written directly into the memory of the sink application 12. It is thereby possible to avoid unnecessary copying of the transferred data into a specific memory area of the receiving application, since it is possible to set the destination (which memory area) to which the data to be transferred is to be sent.

So as to render the memory, which is organized chiefly as an array of bytes, more efficient, a wrapper class is introduced so as to collect the required meta information relating to the respective data records. Moreover, this memory class requires a notification mechanism for informing the applications as to whether the memory object is not being further used. This procedure assumes that a memory object sends an appropriate notification in each case before a first application and after a last application.

In order to enable even large objects to be transferred with only very small storage consumption, recourse is made to the transmission of the objects that are decomposed into chunks 14. By subdividing the object into smaller units, it is also possible for the memory objects to be correspondingly smaller, and therefore to be delimited. The memory objects generated for the chunks 14 to be transferred must consequently be delimited. This can be achieved by fundamentally tapping all the memory objects from a pool and/or by restricting the capacity of queues between the different processing stages of the pipeline.

It is advantageously possible with the aid of the procedure according to various embodiments of the invention to achieve a higher throughput predominantly of very large data volumes that are to be transferred in distributed systems. Attention is further specially turned to transparency as regards address information and position information. The physical position information (for example, IP address) is encapsulated.

An identifier is uniquely assigned to each application. The solution according to an embodiment of the invention comprises a mapping with reference to the respective application identifier. This mapping can be configured very easily.

Figure 5:
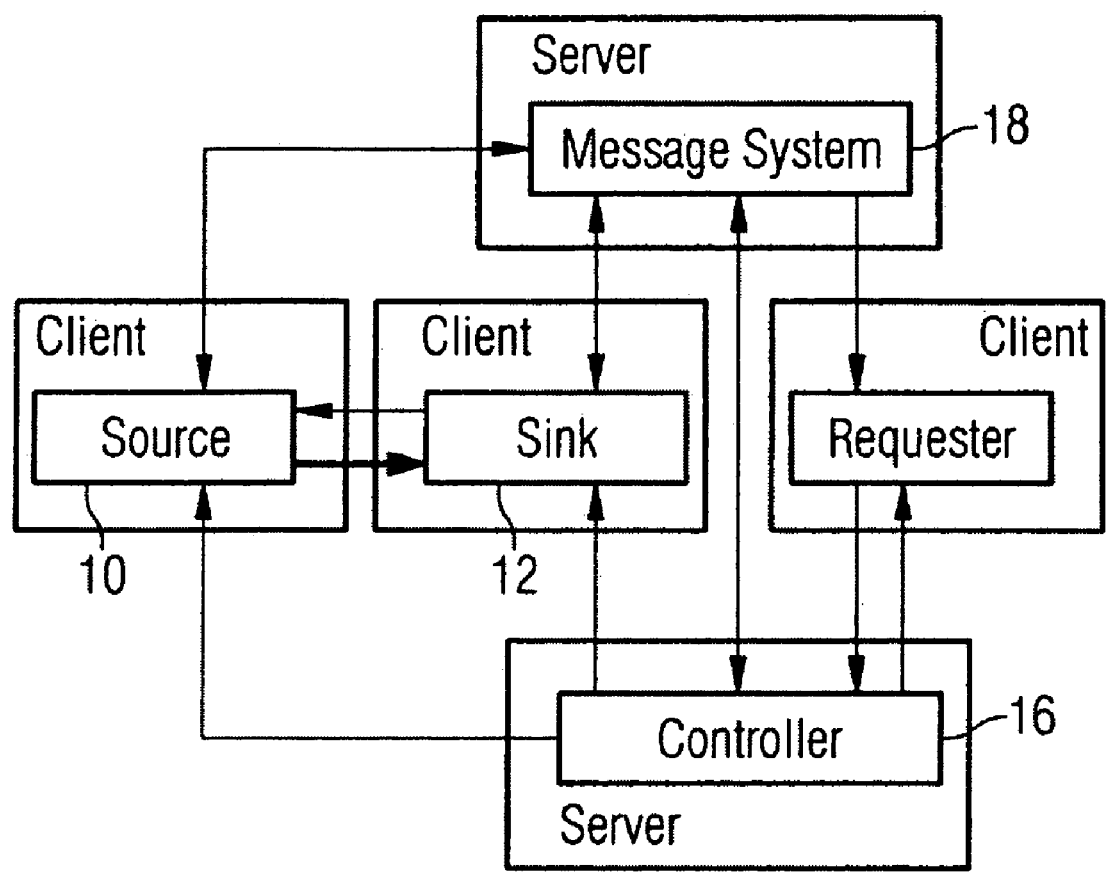
FIG. 5 is a block diagram showing an overview of primary modules in accordance with a preferred embodiment of the invention.

FIG. 5 depicts the five modules with their roles that are involved during a transfer. As may be seen, there are server-side components in the case of the message system 18 and of a central controller 16, while the source 10, the sink 12 and the requester R constitute client-side components. All the client-side components have the same structure and can adopt different roles during a transfer.

The controller 16 executes all the functions that are required for managing and monitoring the transfer. In particular, it determines the two peers, i.e., the source 10 and the sink 12, via unique identifiers and an associated repository, it selects with regard to the participating applications 10, 12 and with regard to the transfer requirements (for example, physical data link, installed functionality or required data format), the matching and optimally designed transfer parameters, it initiates the connection setup and connection cleardown, and it enables a superordinate monitoring and provides high level control mechanisms.

The three client-side roles of the source 10, the sink 12 and the requester R, and their data exchange are likewise illustrated in FIG. 5. They preferably operate on a callback basis. All the modules and/or components are informed of transfer-related changes in status via the message system 18. The requester R, the source 10 and the sink 12 can, for example, also specify those status messages in which they are interested. Not all changes in status then are communicated, but only the selection made by them. This can relieve the message system 18. As soon as a new transfer job arrives, the participating modules are informed of this by the controller 16. A synergistic effect is advantageously produced by the use of the individual components.

The data flow for a transfer job will be described with reference to FIG. 5:

The requester R initiates the transfer via the controller 16. The controller 16 informs the source 10 and the sink 12 about the pending transfer job, the sink 12 additionally being advised of further information that the controller 16 has received from the source 10 when informing the latter. The controller 16 then informs the requester R about the start of the commissioned transfer, and initiates the connection setup between the source 10 and the sink 12. The sink 12 actively generates a connection for the data to be transferred, and monitors the data flow and prompts, for example, starts, interruptions and stops of the data flow.

The message system 18 and/or the controller 16 are informed in the case of a change in status or of an error. The message system 18 filters and distributes the received changes in status to all the components and/or functions that have registered therefor. After termination of the transfer, the controller 16 commissions the sink 12 to clear the transfer connection to the source 10.

The transfer service according to embodiments of the invention must be installed on all clients and on the server of the controller 16. The transfer service primarily performs three tasks:

1. Enquiring at the participating client applications as to which components are available, in order to set up a compatibility matrix for the transfer.
2. Setting up, clearing down and monitoring the transfer pipeline in the case of data transfer, and
3. Handing over by the transfer service of the client-side part of the message service.

It is provided that the controller 16 is used as stand alone component. A single transfer job (for example "Send all the images of the patient X and the radiology") can be subdivided into various subjobs and be split up over individual units that have stored all the images of the patient X. These jobs can be executed in parallel, and so it is possible to minimize the processing time for the entire job.

Furthermore, owing to the interface between the sink 12 and the serializer controller SC, it is possible, in particular, for information to be filtered on the transmitter side.

The functions and/or modules S, Ca, M, Co that can optionally be used are exchangeable and dynamically variable. Provided for this purpose are in each case a dynamically expandable repository of serializers S, converters Co, manipulators M, network adapters that support different network protocols, and adapters that connect the respective applications to the transfer service.

A service interface is made available that enables properties of source 10, sink 12 and/or properties regarding the transfer to be ascertained and, if appropriate, to be varied even during the running time, and to be displayed in a window on a surface of an application 10, 12.

Time-consuming negotiations between the two communication peers at the time of setting up the connection can be avoided due to the preprocessing phase. Moreover, the applications 10, 12 are already able to ascertain and, if appropriate, order in advance the resources required for the transfer. The system can easily be expanded owing to its modular design.

The transfer requirements such as data format and data structure as well as the sequence of the objects to be transferred can be adapted to the receiving application 12.

In an alternative embodiment of the invention, it is provided that statistical information referring to the data transfer is also carried along in order to be available for future selection tasks.

Figure 6:
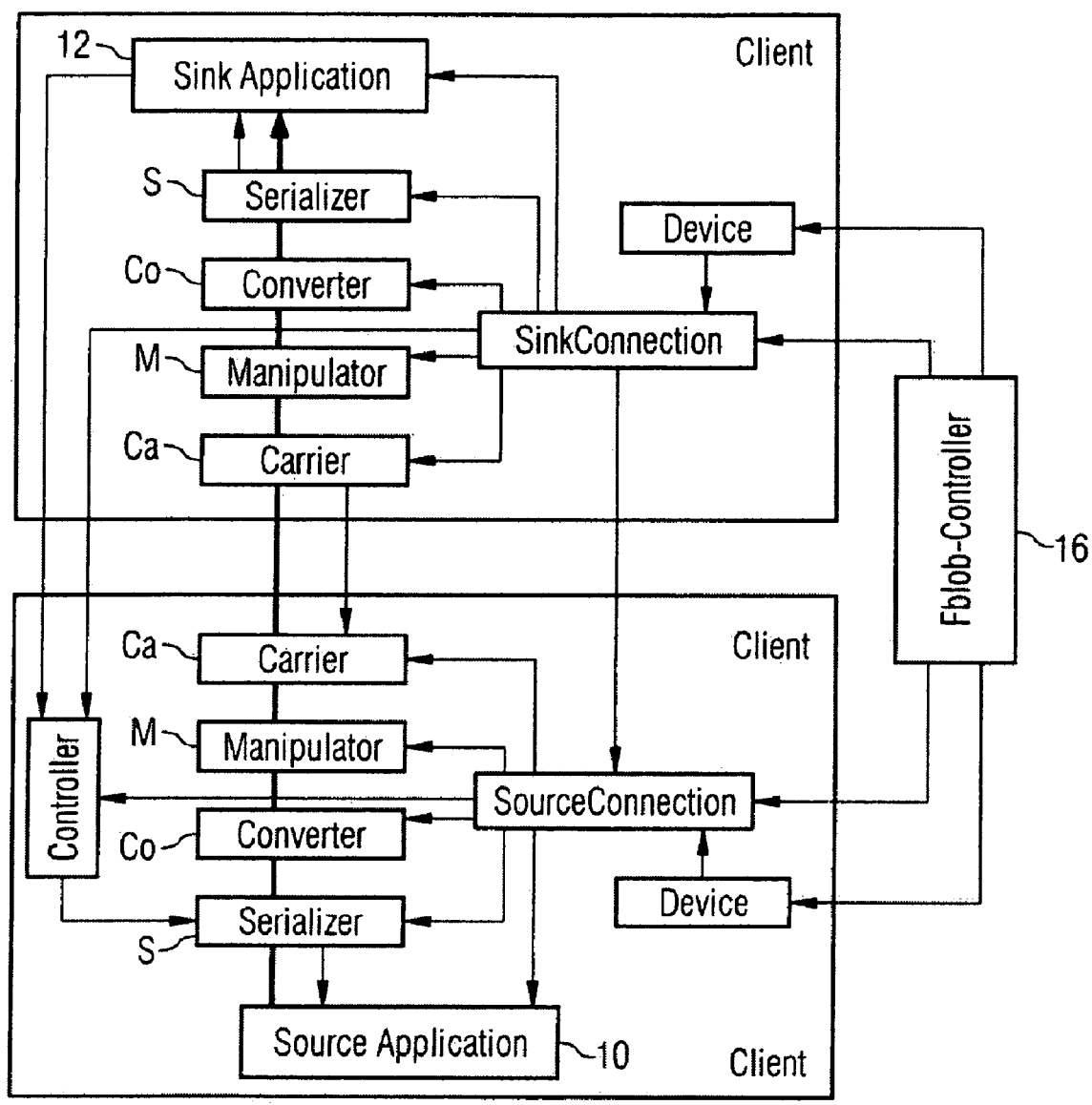
FIG. 6 is a block diagram showing a functional relationship between modules of the invention.

FIG. 6 shows the two interacting communication peers source 10 and sink 12 with the installed modules and the controller 16. Installed in addition to the transfer pipeline on the two clients are modules comprising carrier Ca, manipulator M, converter Co and serializer S, and on the side of the source 10 there are further installed the serializer controller SC as well as, respectively, a device module and interfaces, a sink connection and a source connection.

The data flow according to an embodiment of the invention is described below:

The controller 16 calls the selected source-side device and generates a connection to the source 10. All the required pipeline modules are generated and connected via this connection. The controller 16 prepares the source connection for the transfer job. This preparation is passed on to the source 10 in order thereupon to receive additional information back from the source 10. Then, the controller 16 calls the selected sink-side device in order to generate a sink connection. All the required pipeline modules are initialized and connected via this connection. The controller 16 prepares the sink connection with the aid of the additional information received from the source 10. This preparation is passed on to the sink 12. The controller 16 initiates the connection setup by delivering to the sink connection a reference to the source connection. The sink connection initiates and monitors the operation of setting up the connection. The result is a transfer pipeline that is complete and feasible. If the controller 16 starts the transfer by calling the sink connection, the sink connection triggers the serializer controller SC on the source side. If the above described autostart option is not selected, the sink 12 must start the transfer via the reference and the serializer controller SC. The following two method steps are repeated for each chunk 14 until the transfer is concluded:

1. A chunk 14 is taken from the source 10.
2. The chunk 14 is sent to the sink 12 after it has been passed through all the modules of the pipeline.

The controller 16 then clears down the connection.

It is possible, due to this procedure, that mixed protocols can be used simultaneously and/or even within a transfer, and that changes in configuration can be carried out even during the running time.

In an alternative embodiment of the invention, the controller 16 controls and/or monitors not only the preparation of the data transfer, but also the data transfer itself.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various Figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A method for transferring data from at least one source application to at least one sink application, comprising:
   by an entry made into a computer by a requester, initiating the transfer of the data;
   via said computer, enabling a serializer controller to control a data stream; and
   successively processing the data for the transfer with a pipeline mechanism, the successive processing comprising:
   decomposing, via a serializer function, the data stream before the transfer into individual chunks and reassembling the chunks to form a data stream after the transfer; and
   executing, via a carrier function, the physical data transmission.

2. The method as claimed in claim 1, wherein the serializer function is provided on a side of the source application and on a side of the sink application and decomposes the data stream into individual chunks for reassembling the chunks to form a data stream on a part of the sink application.

3. The method as claimed in claim 1, wherein the serializer controller is at least one of: a) arranged on a side of the source application and b) controlled by the sink application, such that the data transfer that is at least one of: a) transfer data structure, b) a transfer data format, and c) a sequence of the objects to be transferred, can also be adapted to requirements of the sink application dynamically during the transfer.

4. The method as claimed in claim 1, further comprising:
   performing, by the carrier function, at least one of: a) covering tasks of an OSI transport layer or of an OSI transport and network layer, and b) supporting corresponding protocols.

5. The method as claimed in claim 1, wherein the pipeline mechanism is symmetrically designed on the part of a source application and on a part of the sink application.

6. The method as claimed in claim 1, further comprising:
   converting different data formats by a converter function of the pipeline mechanism.

7. The method as claimed in claim 1, further comprising:
   performing different manipulations on the data by a manipulator function of the pipeline mechanism.

8. The method as claimed in claim 1, wherein the requester is formed from at least one of the source application, the sink application and a further application.

9. The method as claimed in claim 1, further comprising, for managing the data transfer, at least one of:
   1) performing, with a central controller function, at least one of:
      a) controlling preparation of the data transfer,
      b) monitoring preparation of the data transfer,
      c) determining the source application and sink application for at least one of:
      c1) the respective data transfer and c2) appropriate functions for the pipeline mechanism,
      d) controlling a setting up and clearing down of the pipeline,
      e) monitoring a setting up and clearing down of the pipeline, and
      f) adapting configurations for the data transfer to transfer requirements, and
   2) collecting, via a central message system, all relevant status information with reference to the data transfer and passing on status variations to participating modules.

10. The method as claimed in claim 1, wherein the data is medical image data.

11. An apparatus for transferring data from at least one source application to at least one sink application, comprising:
    a computer having an input unit configured to allow a requester to initiate the transfer of the data;
    a computerized serializer controller configured to control a data stream, and
    a pipeline that successively processes the data for the transfer, said pipeline comprising
    a computerized serializer configured to decompose the data stream before the transfer into individual chunks and to reassemble the chunks to form a data stream after the transfer, and
    a carrier that executes the physical data transmission.

12. The apparatus as claimed in claim 11, wherein the serializer is provided on a side of the source application and on a side of the sink application and decomposes the data stream into individual chunks and reassembles the chunks to form a data stream on the part of the sink application.

13. The apparatus as claimed in claim 11, wherein the serializer controller arranged on a side of the source application activated according to requirements of the sink application.

14. The apparatus as claimed in claim 11, wherein the carrier provides at least one of: a) covering tasks of an OSI transport layer or of an OSI transport and network layer, and b) supporting corresponding protocols.

15. The apparatus as claimed in claim 11, wherein the pipeline is symmetrically designed on a part of the source application and on a part of the sink application.

16. The apparatus as claimed in claim 11, wherein the pipeline additionally comprises a converter that converts different data formats.

17. The apparatus as claimed in claim 11, wherein the pipeline additionally comprises a manipulator that carries out different manipulations on the data.

18. The apparatus as claimed in claim 11, wherein the requester is formed from at least one of: a) the source application, b) the sink application, and c) a further application.

19. The apparatus as claimed in claim 11, further comprising, for managing the data transfer, at least one of:
    1) a central controller that performs at least one of:
       a) controlling preparation of the data transfer,
       b) monitoring preparation of the data transfer,
       c) determining the source application and sink application for at least one of: c1) the respective data transfer and c2) appropriate functions for the pipeline mechanism,
       d) controlling a setting up and clearing down of the pipeline,
       e) monitoring a setting up and clearing down of the pipeline, and
       f) adapting configurations for the data transfer to transfer requirements, and
    2) a central message system that collects all relevant status information with reference to the data transfer and passes on status variations to participating modules.

20. The apparatus as claimed in claim 11, wherein the data is medical image data.

21. A system arrangement for transferring data, in particular medical image data, from at least one source application to at least one sink application, comprising:

a computerized requester configured to initiate the transfer of the data, a computerized serializer controller configured to control a data stream, and a pipeline that successively processes the data for the transfer, said pipeline comprising a computerized serializer configured to decompose the data stream before the transfer into individual chunks and to reassemble the chunks to form a data stream after the transfer, and a carrier that executes the physical data transmission.

22. The system as claimed in claim 21, further comprising, for managing the data transfer, at least one of:

1) a computerized central controller configured to perform at least one of:
   a) controlling preparation of the data transfer,
   b) monitoring preparation of the data transfer,
   c) determining the source application and sink application for at least one of: c1) the respective data transfer and c2) appropriate functions for the pipeline mechanism,
   d) controlling a setting up and clearing down of the pipeline,
   e) monitoring a setting up and clearing down of the pipeline, and
   f) adapting configurations for the data transfer to transfer requirements, and
2) a central message system that collects all relevant status information with reference to the data transfer and passes on status variations to participating modules.

23. The system as claimed in claim 21, wherein the data is medical image data.

24. A method for managing a data transfer from at least one source application to at least one sink application, comprising:

in a computer, performing at least one of controlling and monitoring, by at least one computerized serializer controller, the data transfer;

said computer being configured to successively process the data for the transfer with a pipeline mechanism, by decomposing, via a serializer function, the data stream before the transfer into individual chunks and reassembling the chunks to form a data stream after the transfer; and executing, via a carrier function, the physical data transmission; and said computer being configured to manage the data transfer by at least one of:

1) performing, with a central controller function, at least one of:
   a) controlling preparation of the data transfer,
   b) monitoring preparation of the data transfer,
   c) determining the source application and sink application for at least one of: c1) the respective data transfer and c2) appropriate functions for the pipeline mechanism,
   d) controlling a setting up and clearing down of the pipeline,
   e) monitoring a setting up and clearing down of the pipeline, and
   f) adapting configurations for the data transfer to transfer requirements, and
2) collecting, via a computerized central message system, all relevant status information with reference to the data transfer and passing on status variations to participating modules.

25. The method as claimed in claim 24, further comprising initiating, via at least one requester, the transfer of the data.

26. The method as claimed claim 24, wherein the controller function:

is integrated in at least one of: a) a hierarchically superordinate level above the other functions of the pipeline, and b) on the level of the applications and of the message system, and provides at least one monitoring mechanism for the data transfer.

27. An apparatus for managing a data transfer from at least one source application to at least one sink application, comprising:

a computerized serializer controller configured to perform at least one of controlling and monitoring the data transfer, and a pipeline that successively processes the data for the transfer, said pipeline comprising:

a computerized serializer configured to decompose the data stream before the transfer into individual chunks and to reassemble the chunks to form a data stream after the transfer, and a carrier that executes the physical data transmission; the data transfer being managed by:

1) a central controller configured to perform at least one of:
   a) controlling preparation of the data transfer,
   b) monitoring preparation of the data transfer,
   c) determining the source application and sink application for at least one of: c1) the respective data transfer and c2) appropriate functions for the pipeline mechanism,
   d) controlling a setting up and clearing down of the pipeline,
   e) monitoring a setting up and clearing down of the pipeline, and
   f) adapting configurations for the data transfer to transfer requirements, and
2) a computerized central message system configured to collect all relevant status information with reference to the data transfer and passes on status variations to participating modules.

28. The apparatus as claimed in claim 27, wherein the apparatus comprises at least one requester that initiates the transfer of the data.

29. The apparatus as claimed in claim 27, wherein the controller is integrated in at least one of: a) a hierarchically superordinate level above the other modules of the pipeline, and b) on the level of the applications and of the message system, the controller providing at least one monitoring mechanism for the data transfer.

30. A system arrangement for managing a data transfer, initiated by a requester, from at least one source application to at least one sink application, comprising:

a computerized serializer controller configured to perform at least one of controlling and monitoring the data transfer, and a pipeline that successively processes the data for the transfer, said pipeline comprising:

a computerized serializer configured to decompose the data stream before the transfer into individual chunks and to reassemble the chunks to form a data stream after the transfer, and a carrier that executes the physical data transmission;

the data transfer being managed with the aid of:

1) a central controller configured to perform at least one of:
   a) controlling preparation of the data transfer,
   b) monitoring preparation of the data transfer, c) determining the source application and sink application for at least one of: c1) the respective data transfer and c2) appropriate functions for the pipeline mechanism,
d) controlling a setting up and clearing down of the pipeline,
e) monitoring a setting up and clearing down of the pipeline, and
f) adapting configurations for the data transfer to transfer requirements, and 2) a computerized central message system configured to collect all relevant status information with reference to the data transfer and to pass on status variations to participating modules.

* * * * *